No. 784,026. PATENTED MAR. 7, 1905.
T. C. BELDING & R. B. HELDMAN.
HEATING AND VENTILATING DRYING APPARATUS.
APPLICATION FILED APR. 4, 1904.
3 SHEETS—SHEET 1.
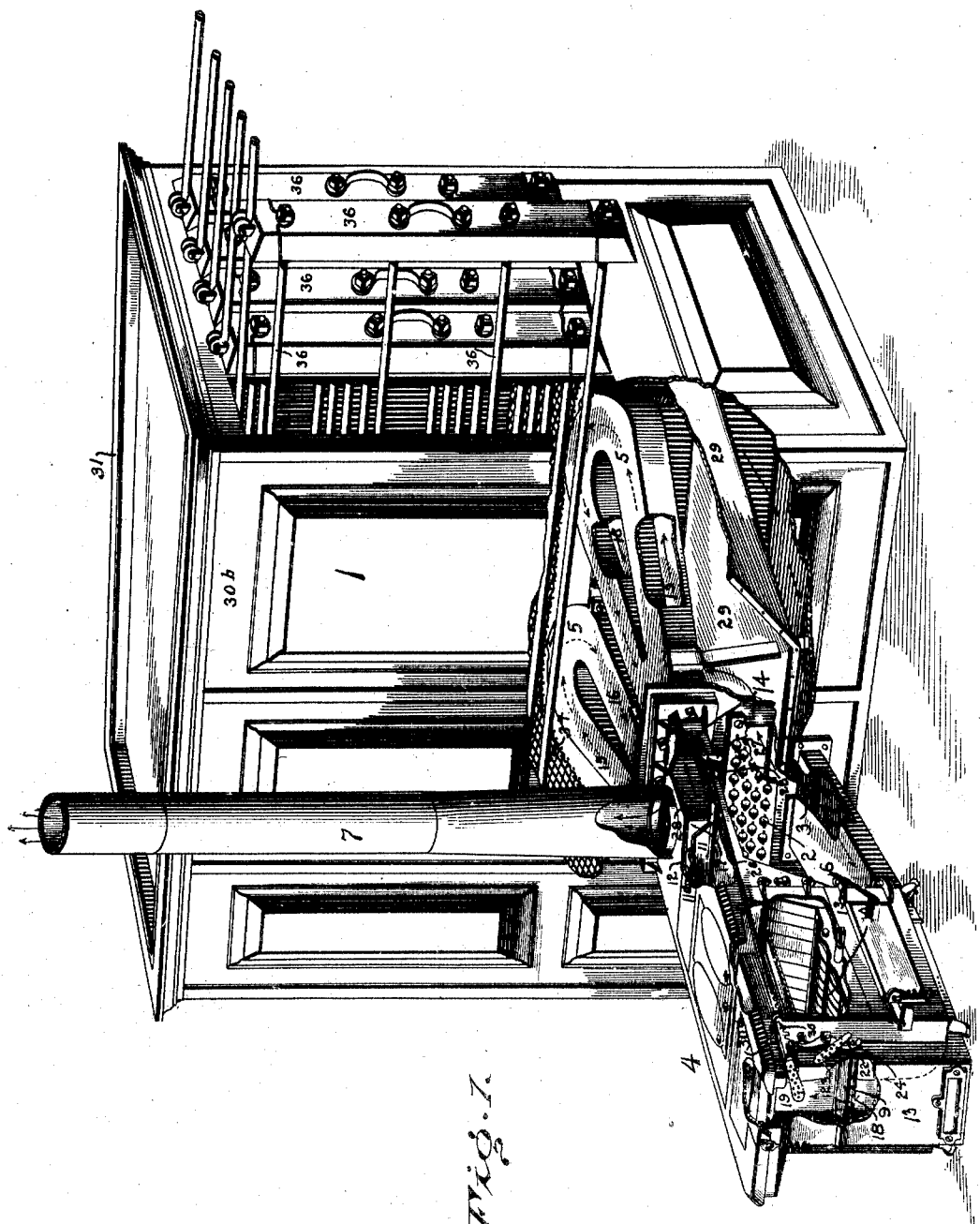

No. 784,026. PATENTED MAR. 7, 1905.
T. C. BELDING & R. B. HELDMAN.
HEATING AND VENTILATING DRYING APPARATUS.
APPLICATION FILED APR. 4, 1904.
3 SHEETS—SHEET 2.
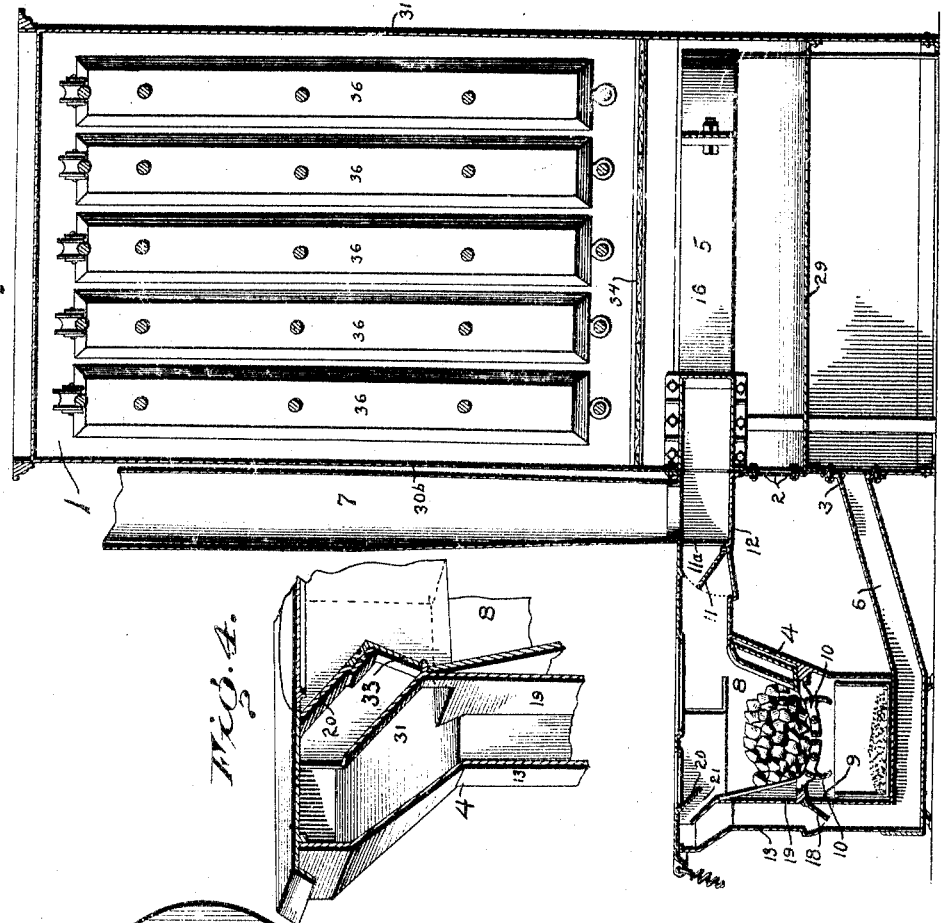
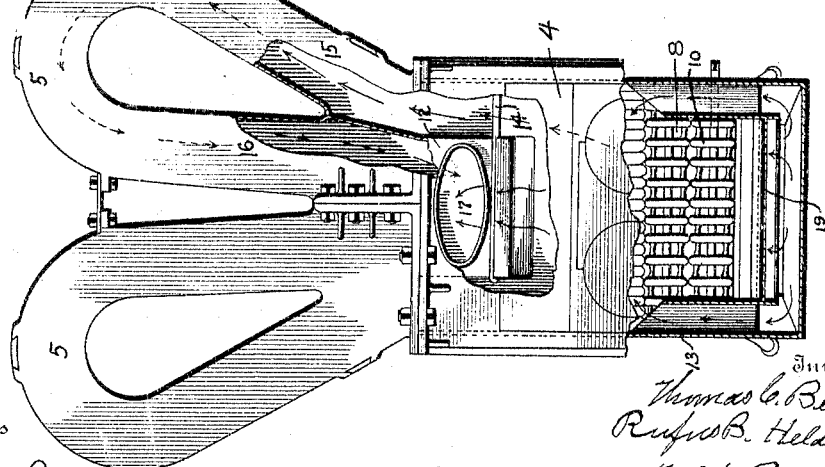
Witnesses
Jos. J. Hosler.
Inventors
Thomas C. Belding
Rufus B. Heldman
By F. W. Bond
Attorney No. 784,026. PATENTED MAR. 7, 1905.
T. C. BELDING & R. B. HELDMAN.
HEATING AND VENTILATING DRYING APPARATUS.
APPLICATION FILED APR. 4, 1904.
3 SHEETS—SHEET 3.
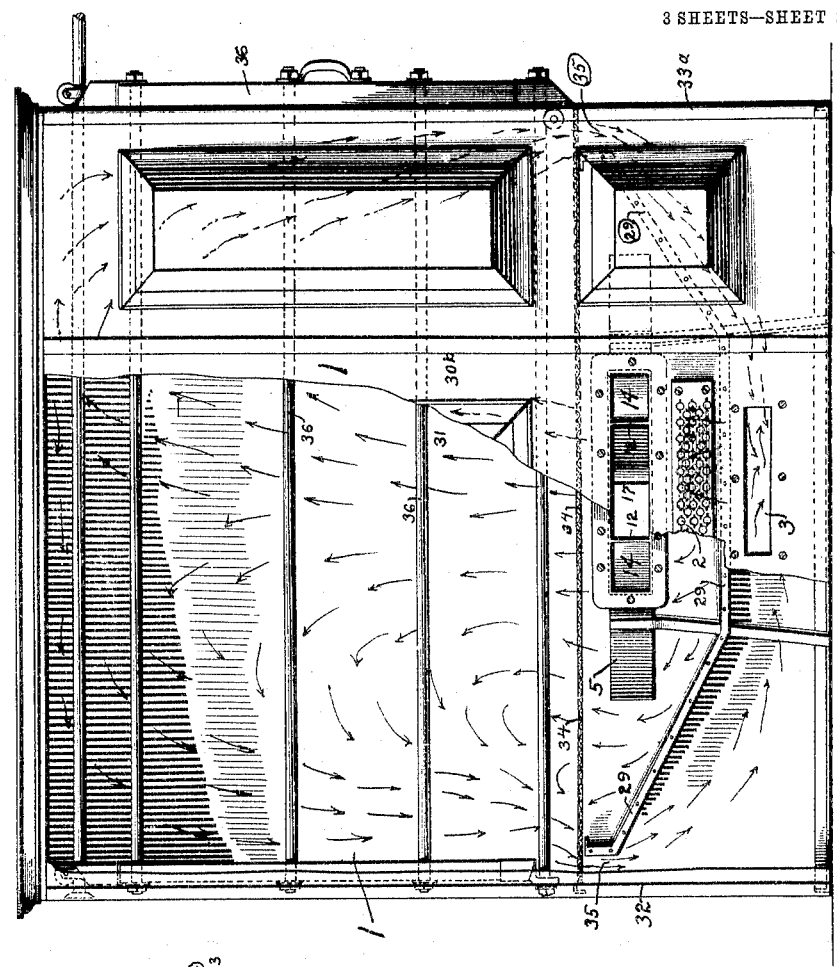
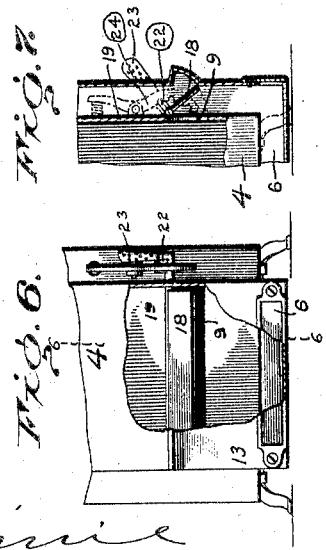
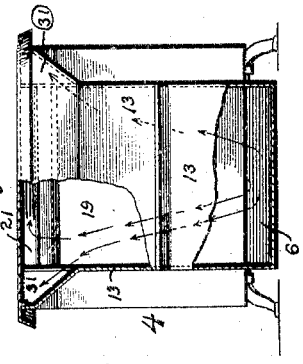

No. 784,026. Patented March 7, 1905.

UNITED STATES PATENT OFFICE.

THOMAS C. BELDING AND RUFUS B. HELDMAN, OF CANTON, OHIO, ASSIGNORS TO THE CANTON CLOTHES DRYER AND MANUFACTURING COMPANY, OF CANTON, OHIO, A CORPORATION OF OHIO.

HEATING AND VENTILATING DRYING APPARATUS.

SPECIFICATION forming part of Letters Patent No. 784,026, dated March 7, 1905.

Application filed April 4, 1904. Serial No. 201,500.

*To all whom it may concern:*

Be it known that we, THOMAS C. BELDING and RUFUS B. HELDMAN, citizens of the United States, residing at Canton, in the county of Stark and State of Ohio, have invented certain new and useful Improvements in Heating and Ventilating Drying Apparatus; and we do hereby declare that the following is a full, clear, and exact description of the same, reference being had to the annexed drawings, making a part of this specification, and to the figures of reference marked thereon.

The present invention has relation to a system of or method for heating and ventilating drying apparatus, and comprehends or comprises a drying-chamber, means of admitting a continuous current of air to the drying-chamber, means for heating the air when within the drying-chamber, and means for removing the heated air and moisture from the drying-chamber, causing a continuous current of air to enter, to become heated, to circulate among the articles to be dried, and be drawn from the drying-chamber cautiously, as hereinafter set forth.

In the accompanying drawings, Figure 1 is a perspective view showing all of the different parts properly arranged with reference to each other and certain portions broken away to illustrate the interior of said portions where necessary for said interior to be shown. Fig. 2 is a central vertical cross-section through Fig. 1 and shows one section of the radiator properly located within the drying-chamber. Fig. 3 is a top view of the stove and radiator, showing portions of these parts broken away to illustrate the travel of the heated air from the stove through the radiators until it reaches the pipe which conducts it to the chimney or flue by which it reaches the outer air. Fig. 4 is an enlarged vertical sectional view through the upper front portion of stove, illustrating a modification of that portion of Fig. 2. Fig. 5 is a side elevation of the drying-chamber, showing a portion of the side next the stove broken away to illustrate the means employed for preventing the air entering the drying-chamber from leaving until it has circulated among the articles to be dried. Fig. 6 is a front view of the stove, showing part of the duct thereof broken away to illustrate the position of the front damper. Fig. 7 is a transverse section on line 6 6, Fig. 6. Fig. 8 is a top view of the stove, showing the position of the side ducts which convey the air beyond the fire when desired.

Similar numerals of reference indicate corresponding parts in all the figures of the drawings.

1 represents the drying-chamber, the illustration showing the interior construction suitable for clothes-drying, but may be designed for drying fruit, cores, enameled articles, or for other purposes.

2 represents the openings for the admission of air to the drying-chamber, which openings may be located in the opposite wall, or openings may be in both walls or ends, if desired.

3 is an opening or aperture from which the air that has entered the drying-chamber through opening 2 is conveyed from the drying-chamber, which process will be hereinafter more fully described.

4 represents a stove which is for the purpose of furnishing heat to the radiators 5, which are located within the drying-chamber, as shown, and are for the purpose of heating the air within the drying-chamber during its passage or transit from openings 2 to opening or aperture 3.

6 represents a duct for the purpose of conveying the air through opening 3 to the stove 4, which air is used for a purpose which will be fully hereinafter described.

7 represents a pipe which conducts heated air, also smoke, gases, and other products of combustion, from the stove and radiators to the chimney or flue and from thence to the outer air.

In the construction of the stove 4 no provision is made for admitting air or oxygen to the fuel-chamber 8 other than supplied by the air which leaves the drying-chamber 1 through opening or aperture 3, which air is drawn or conveyed through duct 6 to opening 9, which opening 9 is located on the rear vertical wall of duct 6 and admits of the air passing under the grate 10 and thence upward between the openings in grate 10 to mingle with the fuel in the fuel-chamber 8, thus accelerating combustion, which combustion superheats, rarefies, and expands the air thus admitted, causing it to seek an outlet with the smoke, gases, and other products of combustion through the pipe 7.

At the rear of stove 4 is located a damper 11, which damper 11 when in a horizontal position allows the smoke, gases, &c., to pass directly into pipe 7 and when in a vertical position closes opening 11$^a$ between the front ends of damper-walls 12 and deflects the superheated currents of air, smoke, gases, and other products of combustion between the damper-walls 12 and the walls 13 of the stove 4, from whence it enters the outer openings 14 of the radiators 5, and thence through and along the outer ducts 15, returning through the inner ducts 16 to openings 17, entering the stove between damper-walls 12 and reaching the pipe 7 passes from thence to the chimney, the draft of the chimney bringing about the circulation, thus sufficiently heating the air within the drying-chamber.

For the purpose of positively causing the air in duct 6 to enter the opening 9 when desired the damper 18 is provided, which damper 18 is attached to rear vertical wall 19 of duct 6 and located directly above opening 9 and so constructed that when raised or extended across duct 6 all of air in duct 6 passes through opening 9. The duct 6 extends upward until it passes above the fuel-chamber, as shown in Figs. 1, 2, and 4. The object of thus extending duct 6 is for the purpose of using the air from the drying-chamber as a check or regulation to combustion when necessary by passing it over or beyond the fire in fuel-chamber. The damper 18 when thrown downward closes opening and admits of air in duct 6 passing upward and entering the stove above the fuel-chamber by passing over the inner wall of duct 6 and under deflecting-plate 20 through passage 21. The air thus admitted by passing over or beyond the fire in fuel-chamber acts as an immediate and positive check to the fire and in its passage over or beyond the fire becomes superheated, and, mingling with products of combustion, passes to rear of stove, enters the radiators, and reaches the pipe-outlet by making the circuit of the radiators, as described. Detent 22 on lever 23 on damper 18 engages the notches in segmented ratchet 24, admitting of damper 18 being held in any desired position or adjustment, thus allowing part of the air in duct 6 to pass through and part pass over the fire, as desired, providing positive control and regulation to combustion.

Damper 11 is raised or lowered by means of rod 26 and intermediate connections, such as lever 27 and shaft 28, for the purpose of holding damper 11 at any desired angle, so as to increase or lessen the opening or passage 11$^a$, leading to pipe 7. Rod 26 is provided with a series of teeth 30, which engage bracket-detent 30$^a$, admitting of damper 18 being held at any desired angle, thus graduating the amount of superheated air entering the radiators, the remainder having direct access to pipe 7, thus controlling and regulating the heat within the drying-chamber.

When it is desired to use fuel which will not admit of the air in duct 6 being passed directly over the fire, the ducts 31 are employed, which ducts 31 convey the air to a point beyond the fire, the stop-plate 33 being employed to close passage 21 between said ducts 27, which air also acts as a check or regulator to combustion in fuel-chamber 8 and becoming superheated passes backward into the radiators 5, and thence to pipe 7, and onward to flue, and thence to outer air.

For the purpose of preventing the air which enters the drying-chamber 1 through opening 2 from passing directly to and out of opening 3 until or before it has become heated and caused to rise and circulate among the articles in drying-chamber the dividing or separating plate 29 is provided, which plate 29 extends horizontally entirely across the drying-chamber from side 36 to side 31 and is located so that it separates openings 2 and 3, as shown in Figs. 1 and 2, and to within a short distance from ends 32 and 33$^a$, as shown in Figs. 1 and 5. The ends of the plate 29 are inclined upward to a point directly under the wire screen 37, which wire screen is for the purpose of preventing articles in process of drying from falling upon the radiators or deflecting-plate and is located directly under drying-racks 36. The openings 35 are for the passage of air to opening 3 after it has become heated by radiators 5. The air entering openings 2 passes directly under the radiators 5 and becoming heated rarefies, expands, and rises, filling the upper portion of the drying-chamber. The continual influx of air at openings 2 causes a continual displacement of the air already heated to ends of drying-chamber, which ends being somewhat cooler than the central portion lower the temperature of the air to some extent, causing the air to descend and find an outlet through openings 34 to opening 3, which is brought about by the draft of the chimney or flue.

We do not confine ourselves to the particular means shown in Figs. 1 and 5 for keeping the air entering the drying-chamber at openings 2 from being drawn to opening 3 before it has become heated or performed the office intended, as there can be many modifications of this idea employed without departing from the nature of this invention.

Any moisture, vapor, or steam liberated, generated, or caused by the action of heat from the radiators upon the articles in process of drying is immediately removed by the continuous currents of air passing through openings 34 in their travel to opening 3 and is carried with the air in duct 6 and in passing through, over, or beyond the fire becomes superheated and mixing with the smoke, gases, and other products of combustion is dissipated and escapes through the flue or chimney to the outer air, having in its passage a tendency to remove soot in stove and radiator, and thus increase rather than diminish the intensity of heat in stove and radiator and augment the draft of flue or chimney.

The air of duct 6 enters stove 4 at a high temperature and but little lower than air in upper portion of drying-chamber, thus requiring the minimum amount of fuel and fire in stove to superheat it to a temperature sufficiently high to maintain the desired degree of heat within the drying-chamber when passing through the radiators. The continued influx of air to drying-chamber, combined with the system of controlling and regulating employed, renders it impossible to overheat or burn the articles in process of drying.

By our particular system or method of continuously admitting air to and heating, circulating, and continuously exhausting the air from the drying-chamber perfect and complete circulation combined with rapid evaporation and ventilation in shortest period of time with greatest economy of fuel is secured, resulting in a drying system of highest obtainable efficiency at minimum cost of operating.

It will be understood that the atmospheric air may be introduced into the drying-chamber at any suitable point, and the air after having performed its function may be withdrawn from the drying-chamber at places other than that shown, and the air thus withdrawn conveyed under, through, over, beyond, or behind the combustion-chamber and the same object accomplished.

Having fully described our invention, what we claim as new, and desire to secure by Letters Patent, is—

1. In a drying and ventilating system, a drying-chamber having located therein a plate, provided with angled flanges, and the flanges spaced from the inner faces of the end walls of the drying-chamber, atmospheric openings located above the plate, radiators located within the drying-chamber and above the plate, said radiators having ducts adapted to receive heated air from the combustion-chamber of the stove, and ducts adapted to remove the air to a flue and a duct leading from the drying-chamber from a point below the plate, said duct extended below the combustion-chamber of the stove, and continued above and over the combustion-chamber, and a damper located in the forward vertical portion of the duct, said damper adapted to close the duct or partially close said duct, substantially as and for the purpose specified.

2. In a drying and ventilating system, a heating device and a drying-chamber, radiators located within the drying-chamber, said radiators having ducts communicating with the flue and the combustion-chamber of the heating device, a damper located between the combustion-chamber and the flue, a plate located within the drying-chamber, and said plate located below the radiators, air inlet and outlet openings located above and below the plate, the upper opening constituting an air-inlet to the drying-chamber and the lower one an air-outlet opening from the drying-chamber, a duct adapted to convey the air from the outlet-opening of the drying-chamber through or over the combustion-chamber of the heating device, substantially as and for the purpose specified.

3. In a drying and heating system, a heating device and a drying-chamber, means for the introduction of air into the drying-chamber, means for heating the air within the drying-chamber, and means for withdrawing the air from the drying-chamber and passing the air through or over the combustion-chamber of the heating device, substantially as and for the purpose specified.

4. In a heating and drying system, a heating device, a drying-chamber, means for the introduction of atmospheric air to the drying-chamber, means for heating the air within the drying-chamber, and means for dividing the cooled air from the heated air contained in the drying-chamber, and means for withdrawing the cooled air from the drying-chamber through or over the combustion-chamber of the heating device, substantially as and for the purpose specified.

5. In a heating and drying system of the class described, a drying-chamber having located therein radiators, an air-inlet located below the radiators, a stove or furnace, a duct extended from the lower portion of the drying-chamber and communicating with said drying-chamber, said duct extended to the combustion-chamber of the stove and adapted to convey the air thus withdrawn into the combustion-chamber, substantially as and for the purpose specified.

6. In a heating and drying system, a heating device and a drying-chamber, said heating device provided with a combustion-chamber, a duct providing atmospheric communication between the drying-chamber and heating device, said duct provided with a damper adapted to shunt the air from said duct, either under or over the combustion-chamber, said damper also adapted to divide the air in duct, and shunt a part under and a part over the combustion-chamber, substantially as and for the purpose specified.

7. In a heating and drying system, a heating device and a drying-chamber, a duct leading from the drying-chamber to the combustion-chamber of the heating device, said duct adapted to remove the cooled air from the drying-chamber, means for dividing the air in the drying-chamber, and means for conveying the cooled air over the combustion-chamber of the heating device, and radiators located in the drying-chamber, and outgoing and return ducts located in the radiators, substantially as and for the purpose specified.

8. In a drying and heating system, a heating device and a drying-chamber, said heating device and drying-chamber connected together and the combustion-chamber of the heating device supplied with air withdrawn from the drying-chamber, and means for dividing the cooled air from the heated air in the drying-chamber, substantially as and for the purpose specified.

9. In a drying and heating system, a flue, a heating device and a drying-chamber, means for the introduction of air into the drying-chamber, means for heating the air within the drying-chamber, and means for withdrawing the air from the drying-chamber, and passing said air to the flue in contact with the fuel in heating device or otherwise, substantially as and for the purpose specified.

10. In a heating and drying system, a heating device provided with a flue, a drying-chamber, radiators located within the drying-chamber, means for the introduction of air into the drying-chamber, the heating device and radiators providing means for heating the air within the drying-chamber, and means for passing said heated air from the drying-chamber through the heating device in contact with the fuel or otherwise, and from thence through the radiators located in the drying-chamber to the flue, substantially as and for for the purpose specified.

11. In a drier, the combination with a cabinet arranged for the reception of articles to be dried and having air-inlet openings, of a radiator disposed within the cabinet, a stove, means for conducting the products of combustion from the stove to the radiator, an exit-pipe communicating with the radiator, and a duct communicating with the interior of the cabinet and with the space beneath the grate of the stove, substantially as set forth.

In testimony that we claim the above we have hereunto subscribed our names in the presence of two witnesses.

THOMAS C. BELDING.
RUFUS B. HELDMAN.

Witnesses:
F. W. BOND,
J. R. BOND.